United States Patent [19]

Tupper et al.

[11] 4,450,738

[45] May 29, 1984

[54] TIRE SPLITTING APPARATUS

[76] Inventors: Myron D. Tupper, 37900 Sandy Heights, Sandy, Oreg. 97055; Richard Bauer, Jr., 34689 SE. Fall Creek, Estacada, Oreg. 97023

[21] Appl. No.: 300,031

[22] Filed: Sep. 8, 1981

[51] Int. Cl.³ .................. B23B 5/14; B29H 21/08
[52] U.S. Cl. .................................. 82/82; 82/101; 157/13
[58] Field of Search .............. 157/13; 82/82, 86, 91, 82/101

[56] References Cited

U.S. PATENT DOCUMENTS

| | | | |
|---|---|---|---|
| 1,603,859 | 10/1926 | Midgley. | |
| 2,254,526 | 9/1941 | Hawkinson | 29/76 |
| 2,939,520 | 6/1960 | Frohlich et al. | 157/13 |
| 2,988,121 | 6/1961 | Frohlich et al. | 157/13 |
| 3,460,419 | 8/1969 | Branick | 83/185 |
| 3,701,296 | 10/1972 | Snow | 82/54 |
| 3,830,120 | 8/1974 | Peterson | 82/54 |
| 4,012,973 | 3/1977 | Tupper | 82/82 |
| 4,096,772 | 6/1978 | Hall et al. | 82/82 |
| 4,157,727 | 6/1979 | McDonough et al. | 157/13 |

*Primary Examiner*—Leonidas Vlachos
*Assistant Examiner*—Jerry Kearns
*Attorney, Agent, or Firm*—Eugene D. Farley

[57] ABSTRACT

A tire splitting apparatus including a frame, a powered drive roll mounted on the frame for rotating a tire, a pressure roll for engaging the tire with the drive roll, and a knife for insertion into the casing while it is rotating for cutting it into halves. A guide is clampable for contact with both side walls of the tire to align and steady the tire so that the knife will cut repeatedly in the same track. A bead support carries substantially all of the weight of the tire during the splitting operation to allow repeated revolutions of the tire as necessary to complete the splitting process.

6 Claims, 10 Drawing Figures

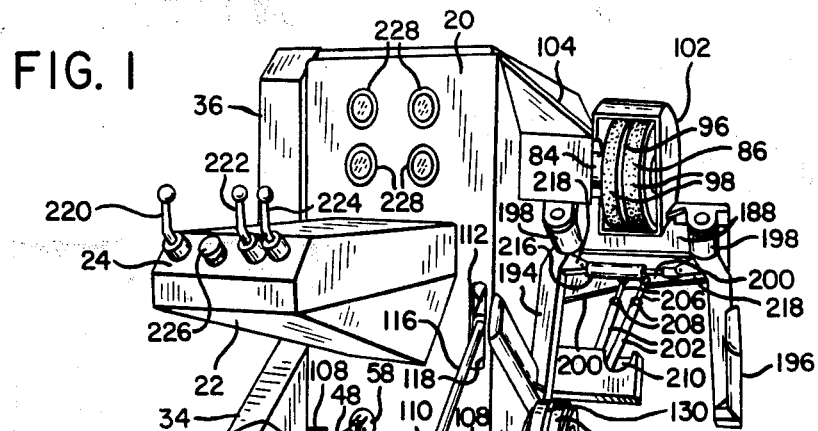
FIG. 1
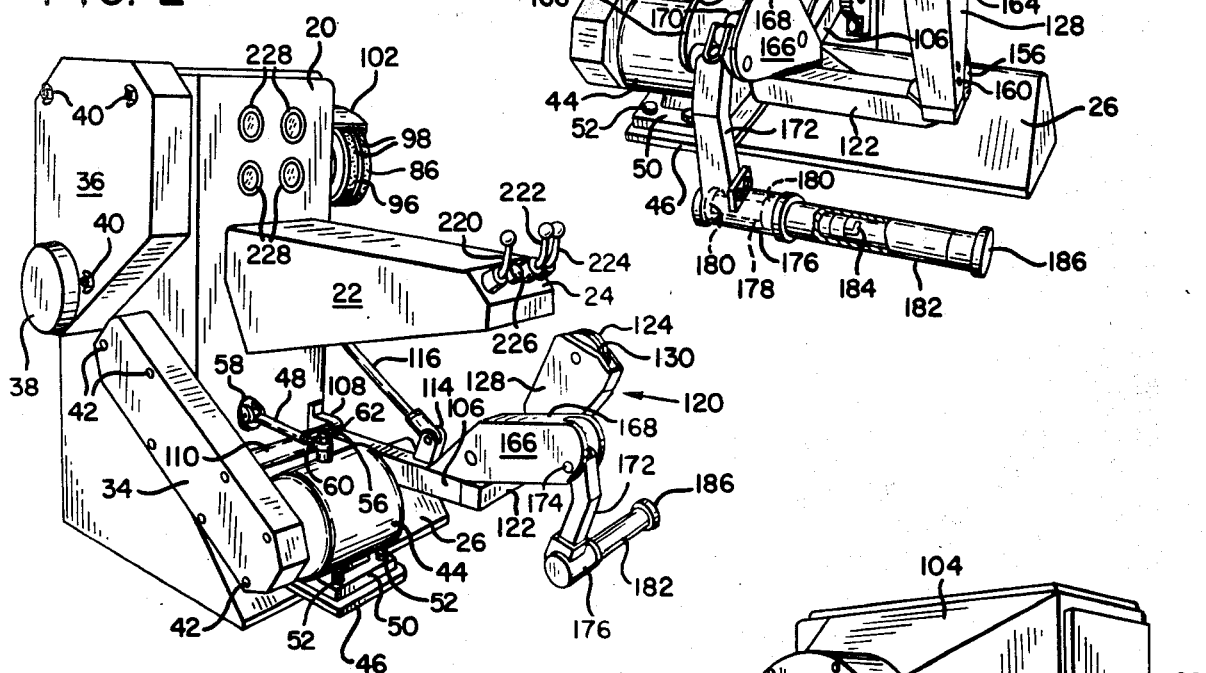
FIG. 2
FIG. 3

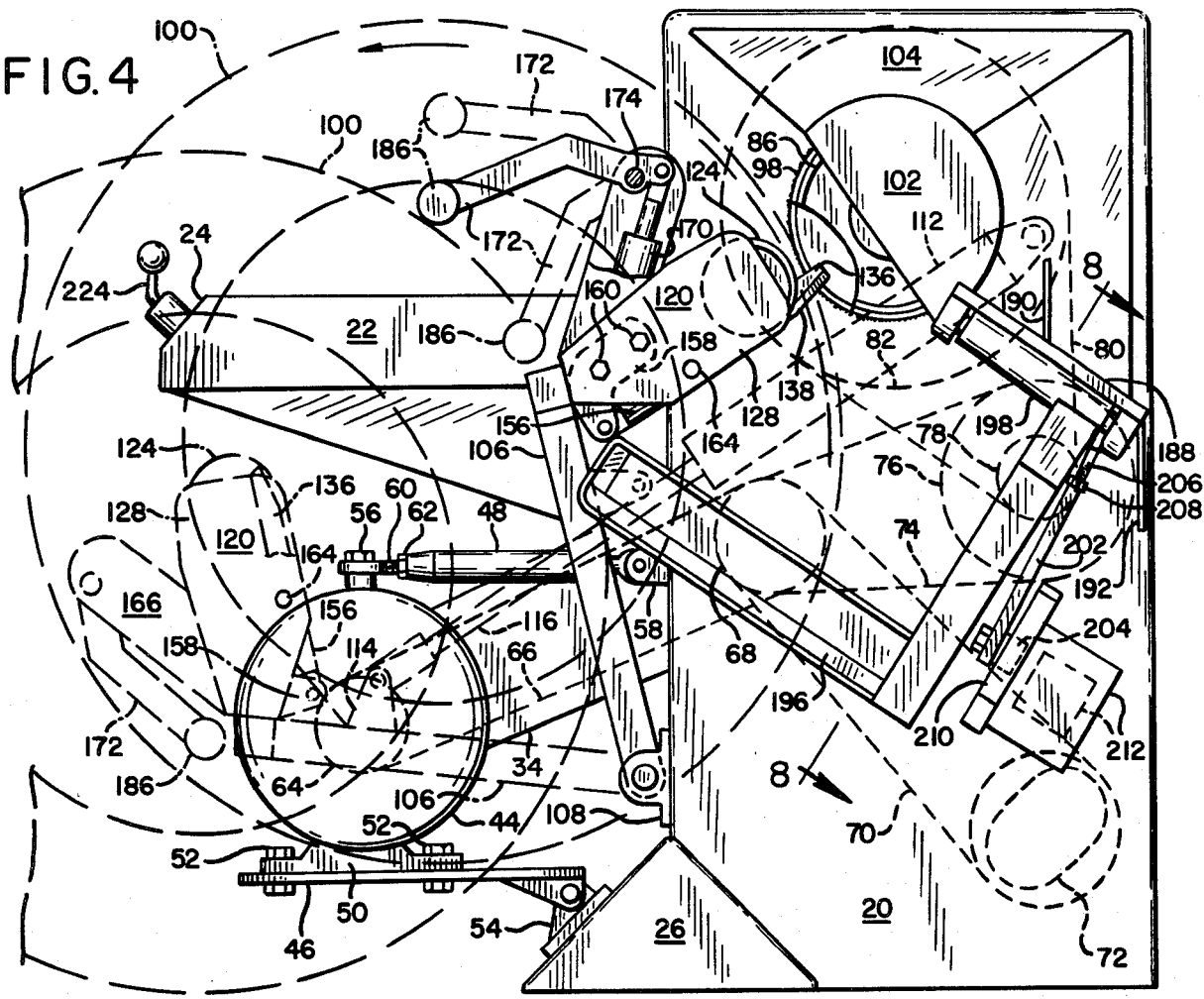
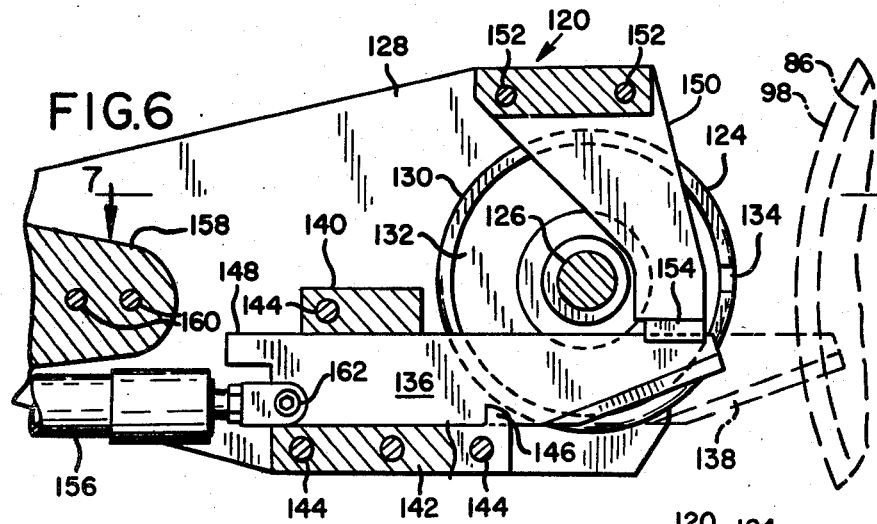
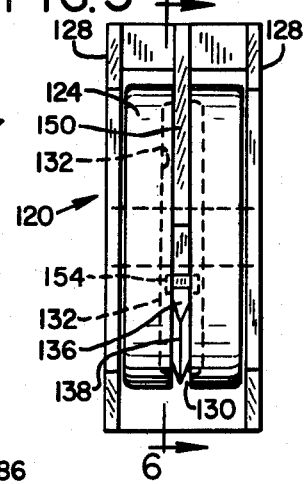
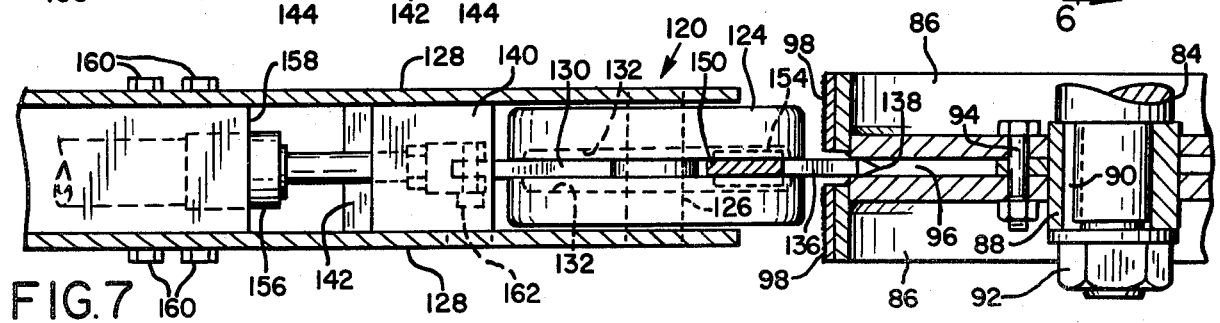

4,450,738

TIRE SPLITTING APPARATUS

BACKGROUND OF THE INVENTION

This invention relates to apparatus for circumferentially splitting tires, and in particular to such a device having improved support and alignment for accurately guiding the tire during the splitting process.

Used tire casings present a considerable disposal problem, particularly because their configuration does not allow compact stacking for storage or transport and internal voids prevent their use in land filling. Due to these problems, it is desirable to split the casings circumferentially, through the center of the crown of the tire, to allow more compact, nestable stacking when stored and fewer trips when transported, and to make land fill burying possible.

Additionally, the resulting casing pieces are more adaptable to further fragmentation processes which might be employed in disposal of the casings.

Prior art tire splitting apparatus generally have utilized rotatably mounted cutting elements positioned outside the tire and working against its crown. As a result, the cutting elements do not easily penetrate the crown of the tire because the crown tends to deflect inwardly and because the cord is often covered with several inches of rubber. Also, the cutting speed of the prior art apparatus has been slow, resulting in inefficient operation.

My prior patent, U.S. Pat. No. 4,012,973 discloses a tire cutting apparatus having a crown support adjacent the inner crown of the tire, and a cutter knife mounted on the crown support. Such a design is effective in cutting many kinds of tires. However, on heavy truck tires it is necessary to rotate the tire several times to completely cut through it. With my previously disclosed apparatus, as well as other prior art tire splitting machinery, the knife sometimes does not cut in the same track on multiple turns. Thus, the tire would not be effectively split into two halves.

In addition, it is a frequent occurrence that during rotation of the tire a portion only is cut through, and that portion opens up and falls off the pressure rolls, requiring time consuming re-mounting.

Accordingly, the general object of the present invention is to provide a tire splitting apparatus having improved tire support for allowing repeated revolutions as necessary to complete the tire splitting process.

Another object is to provide a guide for clamping against the side walls of the tire to true the rotation of the tire.

Yet another object is to provide a bead support for supporting the weight of the tire during the splitting operation.

A further object is to provide an improved knife assembly.

Another object is to provide an apparatus capable of handling a wide range of sizes of tires.

A still further object is to provide means for easily placing a tire on the apparatus and removing the split casing halves.

Other objects and advantages and the manner in which they are achieved will be made apparent in the following specification and claims.

SUMMARY OF THE INVENTION

The present invention is a tire splitting apparatus for splitting tire casings circumferentially into segments, and includes a frame, a powered drive roll for rotating the tire, a pressure roll for engaging the tire with the drive roll, and a knife for insertion into the casing while it is rotating for cutting it into halves. A guide means is clampable for contact with both side walls of the tire to align and steady the tire so that the knife will cut in the same track. A bead support carries substantially all of the weight of the tire during splitting, to allow repeated revolutions for completing the splitting operation. An improved knife assembly facilitates progressively pressing the knife blade through a heavy tire.

BRIEF DESCRIPTION OF THE DRAWINGS

FIG. 1 is a top perspective view of the front and left sides of the tire splitter of the present invention.

FIG. 2 is a top perspective view of the front and right sides of the apparatus of FIG. 1.

FIG. 3 is a top perspective view of the back and left sides of the apparatus of FIG. 1.

FIG. 4 is a diagrammatic side view of the tire splitting apparatus.

FIG. 5 is an end view of the pressure roll head and knife assembly.

FIG. 6 is a section taken along the line 6—6 of FIG. 5.

FIG. 7 is a section taken long the line 7—7 of FIG. 6.

DESCRIPTION OF THE PREFERRED EMBODIMENT

Figure 8:
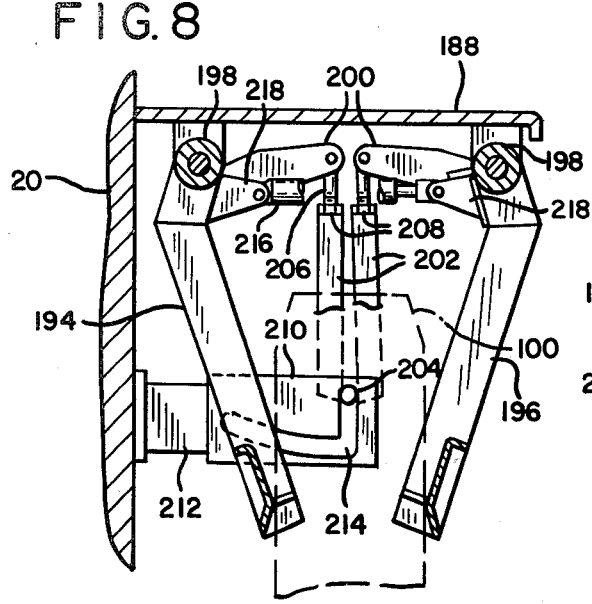
FIG. 8 is a view of the guide means looking in the direction of line 8—8 of FIG. 4.

Referring to the pictorial views of FIGS. 1–3, the complete tire splitting apparatus is illustrated. A frame is provided, including cabinet 20, console housing 22 including operator's console 24, and stabilizing foot 26. The cabinet includes a back door 28 having an appropriate latch 30 and lock 32. The right side of the cabinet includes drive housings 34, 36 and 38, which are easily removable for service by the provision of wing nuts 40 and screws 42.

The drive assembly includes a motor 44 which is attached to the frame by mounting plate 46 and support rod 48. The motor is preferably electric, but a gasoline engine or other power source is also contemplated. Looking at FIG. 4 the motor is mounted by its foot 50 with bolts 52 to the mounting plate, which is in turn hinged to bracket 54 mounted on stabilizing foot 26. The support rod is connected to the top of motor 44 by a bolt 56, and is hinged to bracket 58 which is attached to cabinet 20. The support rod is adjustable by threaded engagement of connector 60 and is secured by lock nut 62.

A pulley 64 on motor 44 drives a belt 66 which drives another pulley 68 within cabinet 30. Pulley 68 supplies power via belt 70 to a hydraulic pump 72. Also, pulley 68 drives a reduction gearing including belt 74, pulleys 76 and 78, belt 80 and pulley 82.

Pulley 82 is mounted on a shaft 84 (FIG. 7) which powers a drive roll 86. The drive roll is journaled on the shaft by a collar 88 having a keyway and a key 90, and mounted by a nut 92. The drive roll is preferably segmented, having two halves fastened by bolts 94 and spaced apart to provide a central circumferential slot 96. The outer surface of the drive roll is faced with frictional pads 98 having a rough surface of a highly durable material such as #16 carbide. The drive roll is engageable with the outer crown of a tire casing 100, (FIGS. 3 and 4) to rotate the tire.

A drive roll housing 102 is provided to shield drive roll 86. Also, it is apparent from FIG. 1 that the drive roll is mounted at a distance from cabinet 20, the extended shaft 84 being covered by a pyramidal extension 104 thereof. This is to allow the drive roll to center on the crown of a large tire. Stabilizing foot 26 also extends out this distance to brace the machine and carry the weight of a large tire.

A tire lift arm 106 (FIGS. 1-4) is pivoted to the frame via brackets 108 attached to cabinet 20. A cross member 110 between brackets 108 stabilizes the tire lift arm for supporting the heavy weight of a tire. Means for pivoting the tire lift arm are provided in the form of hydraulic cylinder 112 attached to ears 114 on the tire lift arm and mounted within cabinet 20 (FIG. 4). The piston rod 116 from cylinder 112 passes through a slot 118 in the cabinet.

A pressure roll head, shown generally at 120, is attached to tire lift arm 106 and is insertable into tire 100. Because of the distance between the side of cabinet 20 and the center of the tire, it is necessary to mount the pressure roll head in line with the tire by lateral extension 122 of the tire lift arm. This aligns the pressure roll head with drive roll 86. It is then able to pivot to a point adjacent the drive roll.

FIGS. 5-7 illustrate the pressure roll head in more detail. It includes a pressure roll 124 mounted on a shaft 126 between two side plates 128. The pressure roll is composed of two halves, having a central circumferential slot 130 therein similar to drive roll 86. The intermediate radial area of the pressure roll is hollowed out further as shown at 132. The purpose of this will be hereinafter discussed. In addition, a widened radial slot 134 communicates with the hollowed out area. The pressure roll is operable to bear against the inner crown of the tire casing at a point adjacent the drive roll, for pressing the casing against the drive roll.

The pressure roll head also mounts a reciprocative knife 136. Its cutting edge 138 is sharpened carbide, providing long life. The knife extends through slot 130 in pressure roll 124, and also extends into slot 96 in drive roll 86. Of course, when cutting a casing, the casing is interposed between the pressure roll and drive roll.

The knife is guided by an upper guideway 140 and an opposed lower guideway 142. Both guideways are fixed to side plates 128 by bolts 144. The lower guideway has upstanding ears 146 to prevent sideways movement of the knife. The rear end of knife 136 includes an extension 148 engaging the upper guideway when the knife is full forward.

A knife support 150 is mounted on pressure roll head 120 by bolts 152. The knife support extends down through slot 130 to the top of the knife. A widened guide 154 has a notch in which the knife blade runs. This widened guide fits in hollow area 132 in the pressure roll. Widened slot 134 allows removability of the knife support. The knife support braces the top of the knife, and supports the load encoutered when glade 138 is pressed into a tire.

A hydraulic cylinder 156 is attached to knife 136 for reciprocating the knife. The cylinder is mounted on pressure roll head 120 in line with the knife by an attachment block 158 mounted by bolts 160. A pin 162 attaches the hydraulic cylinder to the knife, and is accessible through access hole 164 (FIG. 3) for removal of the blade.

A bead support means is provided to prevent a cut through portion of a tire from falling off the pressure rolls. It is preferably mounted on tire lift arm 106 as illustrated in FIGS. 1-4. It comprises side plates 166 which are welded to the tire lift arm, and a cover plate 168. The assembly houses a hydraulic cylinder 170 (FIG. 4) which is attached to a bead support arm 172. The arm is mounted on pivot 174. The arm supports a spindle chuck 176 (FIG. 1) having an inner rotatable shaft 178 mounted on bearings 180. The shaft supports a rotatable spindle 182 providing a bead roll for supporting the bead of tire 100. Various length spindles may be attached to shaft 178 by means of interlocking with keyway 184 and are dimensioned to support both beads of various width tires which may be placed on the machine. The outer end of the spindle is covered by an end cap 186 of increased diameter to align a tire bead adjacent the end of the spindle.

As shown in FIG. 4, hydraulic cylinder 170 is able to pivot arm 172 and thus raise or lower the bead support spindle 182 to engage the bead of the tire. The hydraulic fluid supplied to the cylinder is of sufficient pressure to move the arm quickly into bead engaging position. When in the tire splitting position, a pilot operated check valve in the hydraulic line to cylinder 170 operates to maintain the arm 172 in bead supporting position. This also enables the arm to support a tire of any size and weight during the splitting operation.

A guide means for aligning the tire during the splitting operation is illustrated in FIGS. 1, 3, 4 and 8-10. The guide means is arranged just below drive roll 86 for alignment of the tire prior to its passing into the cutting station. The guide is clampable for contact with both side walls of the tire. Significant pressure is applied, but not enough to appreciably slow the rotation of the tire.

The guide means is attached to the frame by means of support member 188 being attached to cabinet 20. Support member 188 includes braces 190 and 192, as best shown in FIG. 3.

The support member mounts a pair of guide arms, an interior guide arm 194 and an exterior guide arm 196, pivoted on the frame by bearings 198. The bearings are extended in length as best shown in FIG. 3 to provide high bearing strength for the guide arms.

The guide arms 194 and 196 are L-shaped in configuration, each having one leg extending downwardly from the pivot bearing 198 and the other leg extending upwardly and forwardly, substantially perpendicular to the first leg. The forwardly extending leg includes a tire abutting guide surface on its inner side for engagement with the tire.

The guide means is necessarily centered with respect to the drive roll and pressure roll head. To accommodate various size tires, the guide arms 194 and 196 are pivotable equadistantly to center various width tires. A linkage between the guide arms facilitates such clamping.

Figure 9:
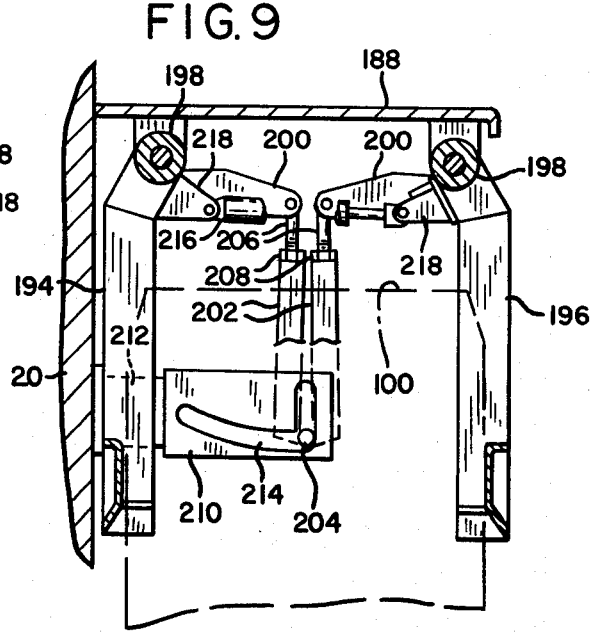
FIGS. 9 and 10 are views of the guide means, similar to FIG. 8.
Figure 10:
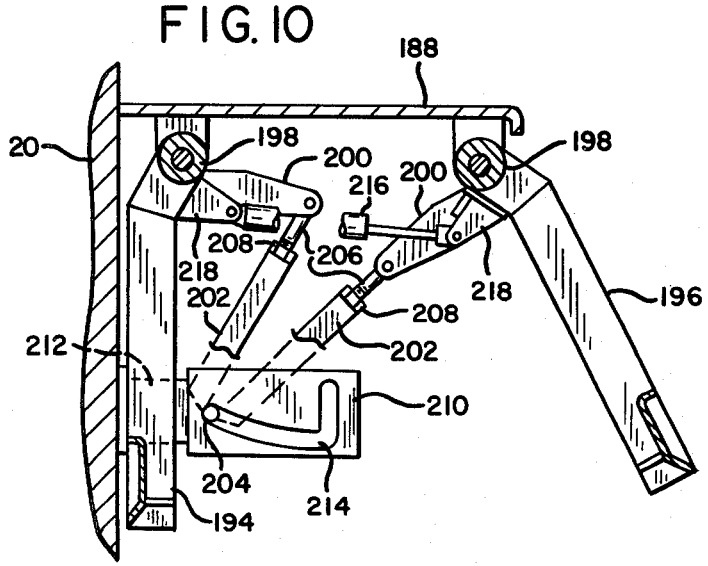

As best shown in FIGS. 8-10 an ear 200 is attached to each guide arm and extends inwardly. A connecting rod 202 is attached to each ear and extends substantially perpendicular to the pivot axis of bearings 198. The two connecting rods are hinged together and mount a cam 204 at their hinge point. Preferably each connecting rod also includes a threaded adjustment rod 206 secured by a lock nut 208.

A cam plate 210 is mounted by suppport 212 on cabinet 20. The cam plate includes an L-shaped slot 214 for cam 204 to run in. The vertical leg of the slot is configured so that the guide arms will move inwardly and outwardly together, as shown by FIGS. 8 and 9, to accommodate various size ties. However, the apparatus is dimensioned so that interior guide arm 194 approaches cabinet 20 for the widest possible tire.

In other to facilitate loading the tire on the machine, exterior guide arm 196 pivots outwardly through an additional angle while interior guide arm 194 remains stationary at the side of the cabinet. This is effected by cam 204 engaging the arcuate leg of slot 214 as shown in FIG. 10. The radius of this slot is the length of rod 202.

A hydraulic cylinder 216 mounted on guide arm 194 and 196 by brackets 218 provides the motive force for moving the guide arms. It is important to note that brackets 218 are mounted so that the hydraulic cylinder is not in line with pivot bearings 198, nor is it in line with ears 200.

The hydraulics of the apparatus are powered by hydraulic pump 72 (FIG. 4) and controlled from the operator's console 24 by several levers (FIGS. 1-3). Lever 220 activates cylinder 112 to move tire lift arm 106. At the same time it activates cylinder 170 to move the bead support arm. Lever 222 activates hydraulic cylinder 216 to control guide arms 194 and 196. Lever 224 activates hydraulic cylinder 156 to control the extension of knife 136. Button 226 is a quick on/off switch for motor 44. Gauges 228 monitor the condition of the hydraulics.

OPERATION

Splitting tires with the apparatus of the present invention is a relatively simple task inasmuch as tires can be split at a steady consistent rate by almost anyone with adequate training who is strong enough to handle the limited amount of work required in its routine operation.

The tire 100 to be split is rolled into position where it can be tipped to center pressure roll head 120 between the beads of the tire. Exterior guide arm 196 is in its wide position where it does not interfere with this operation.

Lever 220 is then pressed forward to raise the pressure roll head inside the casing to pick up the tire. Bead support spindle 182 is also automatically swung into position to support a portion of the weight of the tire, as the pressure roll head causes the outer crown of the tire to contact drive roll 86. As contact is made, the tire is started rotating, ready to start the splitting operation.

Lever 222 is pressed forward which moves tire guide arms 194 and 196 against the tire. The pressure is controlled so that the guide arms do not stop the tire from rotating. Constant pressure is applied throughout the splitting operation.

Lever 224 is then pressed forward which extends knife 136. In cutting large tires it may be necessary to press the knife into the tire slowly, throughout many revolutions of the tire. Thus, the importance of the tire being aligned so that the knife cuts repeatedly in the same track is apparent.

When the tire is completely split, all the levers are pulled back and the tire halves are lowered to the ground ready for removal by the operator.

Having described my invention in its preferred embodiment, I claim:

1. A tire splitting apparatus for splitting tire casings circumferentially into segments, comprising:
    (a) a frame
    (b) a powered drive roll mounted rotatably on the frame and engageable with the outer crown of a tire to rotate the tire;
    (c) a tire lift arm pivoted on the frame and means for pivoting the arm;
    (d) a pressure roll head mounted on the tire lift arm and including a pressure roll insertable into the tire casing and bearing on the inner crown of the casing adjacent the drive roll for pressing the casing against the drive roll;
    (e) a knife mounted on the pressure roll head for reciprocation relative thereto for retractably extending through the crown of the tire;
    (f) power means interengaging the knife and pressure roll head for reciprocating the knife;
    (g) a pair of laterally spaced guide means mounted on the frame for lateral movement of each toward and away from the other for releasable contact with both side wall of a tire for centering various size tires relative to the knife; and
    (h) power means engaging the guide means for moving the latter.

2. The tire splitting apparatus of claim 1 wherein the guide means comprises a pair of guide arms, each pivoted on the frame for movement to make contact with the tire side wall over a range of widths for use in splitting various size tires.

3. The tire splitting apparatus of claim 2 wherein the guide means further comprises linkage for pivoting the guide arms inwardly at the same angle for centering any of various tires with respect to the drive roll and pressure roll head.

4. The tire splitting apparatus of claim 2 wherein the guide means further comprises linkage for pivoting one of the guide arms outwardly while maintaining the other guide arm stationary to facilitate placing a tire between the guide arms.

5. The tire splitting apparatus of claim 1 wherein the guide means comprises:
    (a) a support member attached to the frame,
    (b) a pair of guide arms pivoted on the support member, including an interior guide arm adjacent the frame and an exterior guide arm spaced apart from the frame, each guide arm having a tire abutting surface along its inner side;
    (c) an ear attached to each guide arm and extending inwardly;
    (d) a connecting rod pivoted on each ear and extending substantially perpendicular to the pivot axis, the connecting rods being hinged together;
    (e) a cam attached to the hinge of the connecting rods;
    (f) a cam plate mounted on the frame and having a substantially L-shaped slot for the cam to run in, with one leg of the slot configured so that the guide arms will move inwardly and outwardly together and the other leg of the slot configured to maintain the interior guide arm stationary while the exterior guide arm moves outwardly; and
    (g) a hydraulic cylinder between the two guide arms.

6. The tire splitting apparatus of claim 1 further comprising a bead support mounted on the tire lift arm and arranged for abutting the bead of a tire at the upper portion thereof when the pressure roll head is positioned to press a tire against the drive roll, for supporting substantially all of the tire's weight during splitting.

* * * * *